Sept. 1, 1953

L. L. KIDD 2,650,435

MULTIPURPOSE DEPTH GAUGE

Filed July 10, 1950

INVENTOR
LLOYD L. KIDD
BY
Williamson & Williamson
ATTORNEYS

Patented Sept. 1, 1953

2,650,435

UNITED STATES PATENT OFFICE 2,650,435

MULTIPURPOSE DEPTH GAUGE

Lloyd L. Kidd, Robbinsdale, Minn.

Application July 10, 1950, Serial No. 172,848

8 Claims. (Cl. 33—169)

This invention relates to a multi-purpose depth gauge.

It is an object of my invention to provide a depth gauge capable of measuring the depth of a recess and at the same time the depth of a shoulder formed therein.

Another object is to provide a depth gauge capable of being read directly to furnish the depth and relative depths of a recess and a shoulder within the recess or of two shoulders.

A further object is to provide a depth gauge having a means associated therewith for readily and accurately measuring the depth of a recess of very small diameter.

These and other objects and advantages of my invention will more fully appear from the following description made in connection with the accompanying drawings, wherein like reference characters refer to similar parts throughout the several views and, in which.

Figure 1:
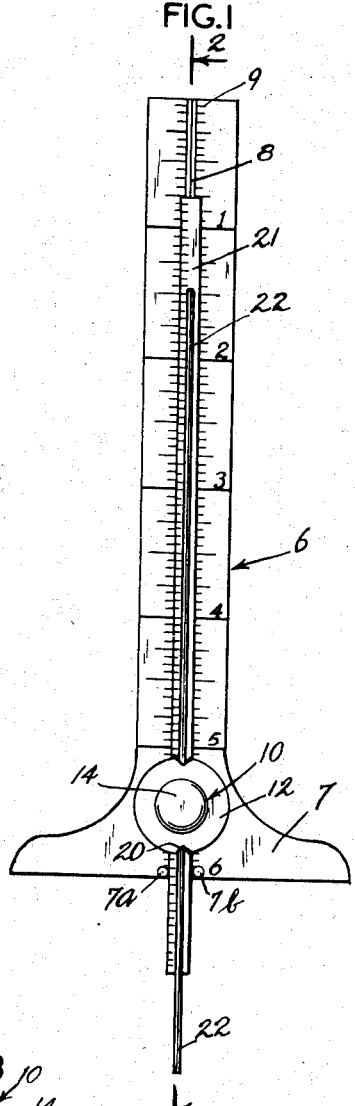
Fig. 1 is a front elevational view of one embodiment of my invention.
Figure 2:
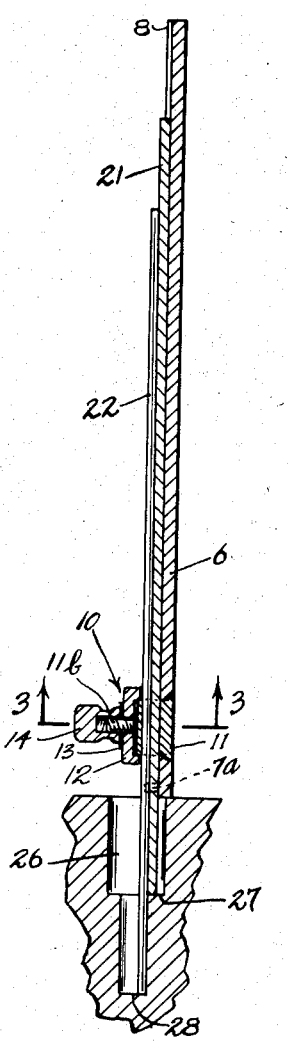
Fig. 2 is a side elevational view of the same shown in position for measuring the depth of a recess and a shoulder formed therein.
Figure 3:
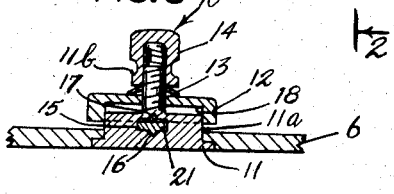
Fig. 3 is a vertical sectional view taken along line 3—3 of Fig. 2.
Figure 4:
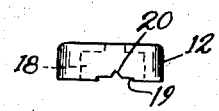
Fig. 4 is a side elevational view of the skirt washer used to guide the narrow rule and rod of the device.

One embodiment of my invention includes, as shown in Figs. 1–3, a generally inverted T-shaped rule 6, the base portion 7 of which is broadened as best shown in Fig. 1. Mounted in upstanding relation to the base portion 7 is a pair of spaced guide pins 7a and 7b disposed adjacent the lower edge of the broadened base portion 7. This rule 6 has a longitudinally extending V-shaped guiding surface or trough 8 formed in its center portion. Along both sides of this V-shaped trough 8 is a scale indicated generally as 9 which commences at the top of the rule 6 and extends downwardly therefrom.

The rule 6 is provided with a clamping apparatus indicated generally as 10 which comprises a countersunk bolt 11, a skirt washer 12, a bent spring washer 13 and a knurled burr or nut 14. The bolt 11 is countersunk in the rule 6 as best shown in Fig. 2 and is provided with an upstanding shoulder 11a and an upper threaded end portion 11b which is adapted to co-operate with the nut 14. As best shown in Fig. 3, the countersunk bolt 11 is provided with a passage 15 of generally rectangular shape which extends longitudinally with respect to the rule 6 through the bolt 11. This passage 15 has a V-shaped trough 16 formed in its lower wall which extends longitudinally with respect to the rule 6 through the bolt 11. The upper wall of the passage 15 has a similar but inverted V-shape trough 17 which extends parallel to the trough 16 and oppositely thereof.

The skirt washer 12 is an annularly shaped member which has a centrally formed recess 18 adapted to receive therein the upstanding shoulder 11a of the counter-sunk bolt 11. Formed in the peripheral portions of the skirt washer 12 is a shallow generally rectangularly formed recess 19, the upper wall of which has an inverted V-shaped indent 20. This recess 19 and indent 20 are formed in two opposite sides of the skirt washer 12 and extend inwardly to communicate with the recess 18.

The passage 15 which extends through the bolt 11 is formed sufficiently high in the base of the bolt 11 so as to extend above the rule 6. This passage 15 accommodates a relatively narrow rule 21 which is flat and superimposed upon the rule 6 as best shown in Figs. 1 and 2. When the clamping mechanism 10 is in loosened position this narrow rule 21 is in free sliding relation relative to the rule 6. Superimposed upon the rule 21 is a generally cylindrical rod 22 of relatively small diameter. This rod 22 is normally in free sliding relation with the narrow rule 21 and is guided by the V-shaped trough 17 of the bolt 11 and the V-shaped trough 20 of the skirt washer 12.

Figure 5:
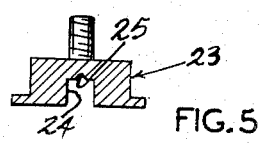
Fig. 5 is a vertical sectional view taken through a variation of the countersunk bolt shown in Figs. 1–3.

Fig. 5 shows a bolt indicated generally as 23 which is a variation of the countersunk bolt 11. This bolt 23 is formed exactly like the bolt 11 with the exception that the lower wall of the passage 15 of the bolt 11 is removed so that instead of a passage there is a generally rectangularly shaped recess 24 extending through the bolt longitudinally with respect to the rule 6. The upper wall of the recess 24 has an inverted V-shaped trough 25 which is comparable to the V-shaped trough 17 in the bolt 11.

When it is desired to measure the depth of a recess or bore such as the recess shown in Fig. 2, which has a shoulder 27 and a bottom 28, the user of my device will first loosen the nut 14 of the clamping mechanism 10 and adjust the gauge as shown in Fig. 2. The base portion 7 of the rule 6 will rest upon the outer surface of the object in which the recess 26 is formed. The lower end of the rule 21 will rest upon the shoulder 27 and the lower end of the small cylindrical rod 22 will abut against the bottom 28 of the recess. Thereafter, the operator of the gauge can prevent relative movement of the rules 6 and 21 and the rod 22 by tightening the nut 14. When this is done the spring washer 13 will press downwardly against the top of the skirt washer 12. This will cause the V-shaped trough 20 to engage and guide the cylindrical rod 22 so as to maintain it parallel to the rules 6 and 21 and will cause the rod 22 to press downwardly upon the rule 21. The upper surface of the rule 21 will as a result be received in the recess 19 of the skirt washer 12 and will be pressed downwardly upon the upper surface of the rule 6 to hold the same from relative movement therebetween. The outwardly extending guide pegs 7a and 7b will assist in maintaining the rule 21 parallel to the rule 6.

Once the adjustments described above have been made the user of the gauge can readily determine the depth of the recess 26, the depth of the shoulder 27, or the distance between the shoulder 27 and the bottom 28 of the recess. This can be obtained by direct reading by referring to the upper ends of the rod 22, the rule 21, and the rule 6. By referring to Fig. 1 it can be readily seen that these values can be read directly from the gauge. The reading of these values is greatly facilitated by the central disposition of the scale 9 on the rule 6. Thus, it can be readily seen that the upper end of the rule 21 readily indicates the precise depth of the shoulder 27 and the upper end of the rod 22 readily indicates the precise depth of the bottom 28 of the recess 26. Also, the top of the rod 22 readily indicates on the scale of the rule 21 the precise distance between the bottom 28 and the shoulder 27.

When the work being performed by the user of the depth gauge is of a nature wherein only straight blind holes are to be measured to determine their depth it is possible for the user to remove the narrow rule 21 and use the rod 22 alone in conjunction with the rule 6 and the clamping mechanism 10. When this is done the rod 22 is firmly guided and maintained in parallel relationship with respect to the rule 6 by the co-operation of the inverted V-shaped trough 17 and the trough 16 as well as the V-shaped trough 20. Thus it can be readily seen that the use of the device is facilitated by removing the one rule 21 which is not being used at that time.

However, when it becomes necessary to obtain a precise measurement of a recess of a very small bore or of a recess having a shoulder formed therein it is possible for the user to re-insert the narrow rule 21 and thereby be provided with a depth gauge which will quickly and readily provide precise measurements of the same.

It should be noted that by using my device, it is possible to obtain precise measurements of the depth and relative depths of a shoulder or a plurality of shoulders within a narrow recess or bore. It should also be noted that these precise measurements are apt to be more accurate in view of the direct reading provision inherent in my device and that through the use of my device it is possible for a user to readily determine the depth of recesses of a very small bore. Depth gauges previously known in the art to the applicant have never provided a means whereby accurate measurement can be obtained of the depth of a very small bore and/or of a shoulder therein.

It will, of course, be understood that various changes may be made in the form, details, arrangement and proportions of the various parts without departing from the scope of my invention.

What I claim is:

1. A multi-purpose depth gauge comprising a relatively wide rule, a relatively narrow rule superimposed upon said first mentioned rule in free sliding and substantially parallel relation thereto, and a generally cylindrical rod of relatively small diameter superimposed upon said second mentioned rule in free sliding and substantially parallel relation thereto, and means extending through said relatively wide ruling for releasably holding said rod and said rules from relative movement therebetween.

2. A multi-purpose depth gauge comprising a relatively wide rule, a relatively narrow rule superimposed upon said first mentioned rule in free sliding and substantially parallel relation thereto, and a rod of relatively small diameter superimposed upon said second mentioned rule in free sliding and substantially parallel relation thereto, and means extending through said wide rule for releasably holding said rod and said rules from relative movement therebetween, said means including guiding structure for maintaining said rod in parallel relation relative to said rules.

3. A multi-purpose depth gauge comprising a relatively wide rule having a guide surface associated therewith, a rod of relatively small diameter superimposed upon said rule in free sliding relation thereto and extending longitudinally thereof, and means extending through said relatively wide rule for releasably holding said rod and said rule from movement therebetween, said means including a guide surface adapted to cooperate with said guide surface of said rule to positively guide said rod and maintain it in parallel relation to said rule when said rod is slid along said rule.

4. The structure defined in claim 3, at least one of said guide surfaces being generally V-shaped.

5. A multi-purpose depth gauge having in combination a relatively wide rule, clamping means extending through said rule, said clamping means having a passage extending therethrough substantially parallel to said rule, a relatively narrow rule superimposed upon said first mentioned rule and extending through said passage parallel to said first mentioned rule, and a rod of relatively small diameter superimposed on said second mentioned rule and extending through said passage substantially parallel to said rules, said clamping means being adapted for releasably securing said rod and said rules from relative movement therebetween.

6. A multi-purpose depth gauge having in combination a relatively wide generally T-shaped rule, clamping means countersunk in the lower end of said rule and extending therethrough, said clamping means having a passage extending therethrough longitudinally of said rule, a relatively narrow rule superimposed upon said first mentioned rule and extending through said passage longitudinally of said first mentioned rule, and a rod of relatively small diameter superimposed upon said second mentioned rule and extending through said passage longitudinally of said rules, said clamping means being adapted for releasably securing said rod and said rules to prevent relative movement therebetween and including a generally V-shaped guide surface extending longitudinally of said rod for guiding the same and maintaining it in parallel relation to said rules.

7. The structure defined in claim 6, each of said rules having scales associated therewith reading away from corresponding ends of said rules to make possible the direct reading of the positions of the opposite ends of said narrow rule and said rod relative to said first mentioned rule and to each other by referring to the positions of said corresponding ends of said rules and said rod relative to said scales.

8. A multi-purpose depth gauge having in combination a relatively wide rule having a longitudinally extending generally V-shaped recess therein, clamping means associated with said rule, said clamping means having a recess formed therein, said recess extending upwardly above said rule and longitudinally of said rule, a relatively narrow rule superimposed upon said first mentioned rule and received within said recess and extending longitudinally of said first mentioned rule, and a generally cylindrical rod of relatively small diameter superimposed on said second mentioned rule and being received within said recess and extending longitudinally of said rules, said clamping means being adapted for releasably securing said rod and said rules from relative movement therebetween said recess of said clamping means being of generally inverted V shape to cooperate with the recess of said wide rule when said narrow rule is withdrawn to effectively hold and guide said cylindrical rod in parallel relation to said wide rule.

LLOYD L. KIDD.

References Cited in the file of this patent

UNITED STATES PATENTS

| Number | Name | Date |
|---|---|---|
| 401,292 | Mumford | Apr. 9, 1889 |
| 750,449 | Gillard | Jan. 26, 1904 |
| 1,248,340 | Kinney | Nov. 27, 1917 |
| 1,638,887 | Sirokman | Aug. 16, 1927 |
| 1,679,473 | Kabisius | Aug. 7, 1928 |
| 2,175,650 | Schober | Oct. 10, 1939 |
| 2,336,393 | Cumbes | Dec. 7, 1943 |
| 2,356,544 | Swanson | Aug. 22, 1944 |
| 2,492,369 | Robins | Dec. 27, 1949 |

FOREIGN PATENTS

| Number | Country | Date |
|---|---|---|
| 253,742 | Switzerland | Mar. 31, 1948 |